Dec. 16, 1969 W. G. SCHWIDT 3,484,782
BIORTHOGONAL CODE GENERATOR
Filed June 16, 1967
FIG. 1
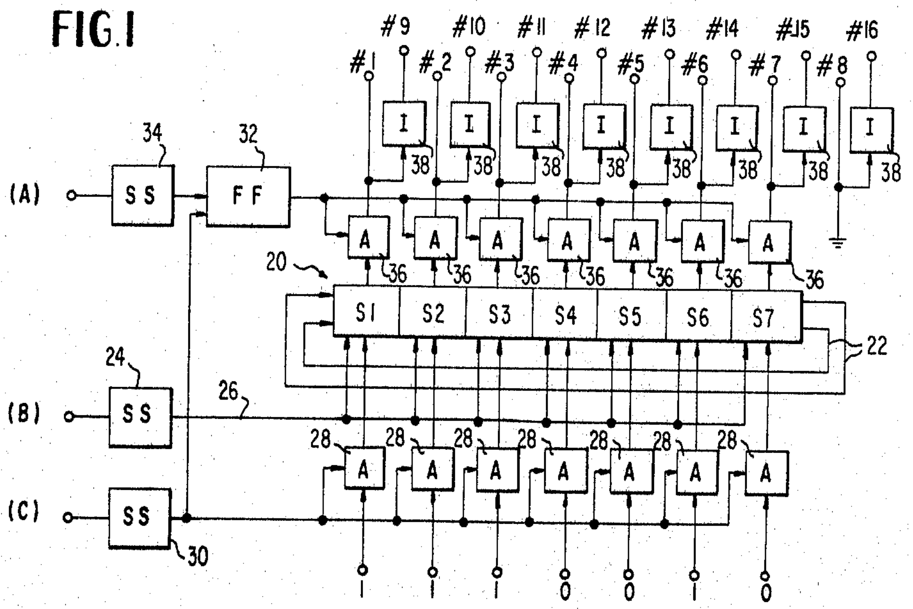
FIG. 2
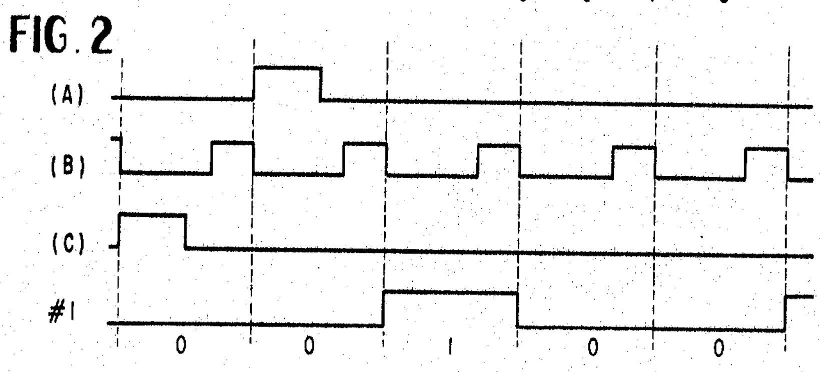
| | | | | | | | | | | | | | | | | | | |
|---|---|---|---|---|---|---|---|---|---|---|---|---|---|---|---|---|---|---|
| MESSAGE # | 1 | 0 | 0 | 1 | 0 | 0 | 1 | 1 | 1 | MESSAGE # | 9 | 1 | 1 | 0 | 1 | 1 | 0 | 0 | 0 |
| " | 2 | 0 | 1 | 0 | 1 | 0 | 0 | 1 | 1 | " | 10 | 1 | 0 | 1 | 0 | 1 | 1 | 0 | 0 |
| " | 3 | 0 | 1 | 1 | 0 | 1 | 0 | 0 | 1 | " | 11 | 1 | 0 | 0 | 1 | 0 | 1 | 1 | 0 |
| " | 4 | 0 | 1 | 1 | 1 | 0 | 1 | 0 | 0 | " | 12 | 1 | 0 | 0 | 0 | 1 | 0 | 1 | 1 |
| " | 5 | 0 | 0 | 1 | 1 | 1 | 0 | 1 | 0 | " | 13 | 1 | 1 | 0 | 0 | 0 | 1 | 0 | 1 |
| " | 6 | 0 | 0 | 0 | 1 | 1 | 1 | 0 | 1 | " | 14 | 1 | 1 | 1 | 0 | 0 | 0 | 1 | 0 |
| " | 7 | 0 | 1 | 0 | 0 | 1 | 1 | 1 | 0 | " | 15 | 1 | 0 | 1 | 1 | 0 | 0 | 0 | 1 |
| " | 8 | 0 | 0 | 0 | 0 | 0 | 0 | 0 | 0 | " | 16 | 1 | 1 | 1 | 1 | 1 | 1 | 1 | 1 |
FIG. 3
*INVENTOR*
W. G. SCHMIDT
BY Sughrue, Rothwell, Mion, Zinn & Macpeak
*ATTORNEYS*

United States Patent Office 3,484,782
Patented Dec. 16, 1969

3,484,782
BIORTHOGONAL CODE GENERATOR

William G. Schmidt, Rockville, Md., assignor to Communications Satellite Corporation, a corporation of Washington, D.C.

Filed June 16, 1967, Ser. No. 646,679
Int. Cl. H03k *13/00*
U.S. Cl. 340—348 4 Claims

ABSTRACT OF THE DISCLOSURE

A ring-connected shift register for serially generating all of the biorthogonal code words in a 16 word set. Each code word is basically a different phase of the same bit sequence, in both true and complement form. By placing the sequence in a recirculating shift register, the serial output from each stage after a complete cycle represents one of the code words.

BACKGROUND OF THE INVENTION

Phase-coherent communications using orthogonal or biorthogonal code words to represent discrete messages has great merit where transmission interference, such as white gaussian noise, is probable, since such code words are ideally suited to accurate detection using cross-correlation techniques. In an orthogonal code word set, each word differs from every other word by the same number of bits as it resembles every other word. For example, two orthogonal code words in an 8 word set might be 01101001 and 00111010, and it will be noted that bits 2, 4, 7 and 8 are different while bits 1, 3, 5 and 6 are the same. As such, the cross-correlation coefficient between any two words in a set is 0, and thus, the cross-correlation detection or decoding of messages translated by such words achieves a high degree of accuracy, even in the presence of considerable channel noise.

Such coding is even more attractive in that the capacity of a given orthogonal code word set may be doubled by expanding it into a biorthogonal set, which merely amounts to adding the complement of each orthogonal code word in the set. The complementary set of code words are orthogonal with respect to each other and also with respect to each code word in the true set except that word from which the complementary word was derived. The latter exception poses no decoding problem, however, since complementary words differ from each other to the maximum extent, that is, one is the complete reverse of the other, and thus, the likelihood of confusion is minimal. As an example, using the same two orthogonal code words as before, the complements are 10010110 and 11000101. These complementary words differ from each other at four bit positions and are the same at four bit positions, and the same applies to the first and second complement words with respect to the second and first true words. For a more complete discussion of phase-coherent communications and biorthogonal coding, see Technical Report No. 32–25 of the Jet Propulsion Laboratory, dated Aug. 15, 1960, by A. J. Viterbi, entitled "On Coded Phase-Coherent Communications."

The usual way of implementing such a communication technique is to store or generate each of the orthogonal code words in a set at the transmitting station. Each code word represents a discrete message, and when it is decided to send the particular message, its corresponding code word is transmitted. At the receiver, the received code word is simultaneously compared with each code word in the complete set in a set of parallel correlators, and a decision device responsive to the correlator outputs determines which code word or message was transmitted by selecting the correlator having the largest output.

Because all of the code words are orthogonal, the outputs from all of the other correlators will be zero under ideal conditions.

It can thus be seen that such a system requires the storage or generation of each of the code words in a set at the receiver, as well as the transmitter. In the conventional systems, this has been accomplished by either storing the exact replicas of each code word or by providing separate encoders or generators for each word. When using an 8 word set of 8 bit words, the permanent storage technique requires 64 bits of storage and the most efficient encoder comprises a four stage register, two mod 2 adders and one flip-flop for each code word set. Such extensive hardware requirements not only become prohibitive from cost and reliability standpoints, but where weight considerations are critical, such as in guided missile and communication satellite systems, these hardware needs are wholly unacceptable.

SUMMARY

The excessive hardware requirements of the prior art systems noted above are effectively overcome by this invention which provides a novel orthogonal or biorthogonal code generator in the form of a ring-connected shift register circuit. The circuit serially generates all of the code words in a given set and requires a total number of stages or storage positions equal to one less than the number of bits in each code word. For the 8 word set of 8 bit words considered above, 7 storage positions would be the total requirement. Such a savings is realized by taking advantage of the fact that each orthogonal code word in a complete set is merely a different phase of the same bit sequence, with the exception of the first bit in each word which is always the same, and the last word which is a repetition of the same bit, as will be more apparent later on.

In a specific embodiment adapted for the generation of an 8 word set of 8 bit words, the initial 7 bit sequence is loaded into a seven stage register in parallel during the first clock period. At the same time, all of the register output gates are disabled, which results in the same first bit being generated for each word. Thereafter, the gates are unblocked and the register is stepped or advanced each clock period in the usual manner, with the output from the last stage always being fed back as an input to the first stage in a recirculating or ring fashion. After 8 clock periods, the entire orthogonal code word set will have been generated, with each output gate supplying a different code word in serial form.

BRIEF DESCRIPTION OF THE DRAWINGS

The foregoing and other objects, features and advantages of the invention will be apparent from the following more particular description of a preferred embodiment of the invention, as illustrated in the accompanying drawings, in which:

FIGURE 1 shows a block diagram of a ring-connected shift register circuit constructed in accordance with the teachings of this invention, FIGURE 2 shows waveform diagrams of signals appearing at certain terminals in the circuit of FIGURE 1, and FIGURE 3 shows the complete biorthogonal code word set generated by the circuit of FIGURE 1.

DESCRIPTION OF THE PREFERRED EMBODIMENT

Referring now to the drawings, FIGURE 3 shows a typical biorthogonal code word set, including eight true words or messages numbered 1–8, and eight complementary words or messages numbered 9–16. A study of FIGURE 3 reveals the following characteristics of the set:

(a) Message #9 is the complement of message #1, message #10 is the complement of message #2, etc., (b) The first bit position of messages #1–8 is zero and the first bit position of messages #9–16 is 1.

(c) Message #8 is all zeros and message #16 is all ones.

(d) With the exception of the first bit in each word and the last word in each group, each message has the same binary sequence as the one above it shifted one bit to the right, and finally (e) Each message or word has four bit positions in common with every other word and differs from it at four bit positions, with the exception of its complement.

It may thus be appreciated that if any message is correlated with any other message except its complement by multiplying the two messages together, bit by bit, and integrating the results, the final result will be zero ignoring any noise problems. This obtains since, due to characteristics (e) above, the integrating capacitor will be positively charged to the same extent that it is negatively charged, with the net or final charge being zero.

Turning now to the code generator circuit of FIGURE 1, shift register 20 comprises seven stages S1, S2, etc., with the output from stage S7 being fed back as the input to stage S1 over lines 22. The register is stepped or advanced by a clock train applied at terminal B to a monostable multivibrator or Single Shot 24 and fed to the register stages over line 26. The initial register inputs, shown at the bottom of the figure, are loaded into the stages in parallel through AND gates 28 in response to a conditioning signal applied at terminal C to Single Shot 30, and the same signal is also fed to the reset input of Flip-Flop 32. The latter is set by a signal applied at terminal A through Single Shot 34. The conditions or states of the various register stages are fed to separate output terminals through AND gates 36 conditioned by the output from Flip-Flop 32. The output terminals are numbered 1–8 corresponding to the messages or code words generated at them, and the complementary messages are obtained at terminals 9–16 by coupling the corresponding true messages through Inverters 38. Since message #8 is all zeros, output terminal #8 is simply grounded and by inverting the ground signal, output terminal #16 is always raised and thus supplies all ones which corresponds to message #16.

In operation, the seven bit starting sequence 1110010 is coupled to AND gates 28, and when the latter are enabled by waveform C of FIGURE 2 at the beginning of the first clock period, the sequence is loaded directly into the seven register stages. Actually, the waveforms shown in FIGURE 2 appear at the output terminals of the three Single Shots 24, 30 and 34. The latter components are provided to properly shape the pulse signals applied to terminals A, B and C. Waveform C also resets Flip-Flop 32 whose lowered output disables the output AND gates 36 causing all zeros to appear at output terminals #1–8 and all ones to appear at output terminals #9–16. Referring to FIGURE 3, it will be seen that this is in agreement with the code word set. Near the end of the first clock period, a clock pulse from Single Shot 24, shown by waveform B in FIGURE 2, advances the register one step, which results in the sequence 0111001. At the beginning of the second clock period, a pulse triggers Single Shot 34 whose output, shown by waveforms A in FIGURE 2, sets Flip-Flop 32 which conditions or enables the output AND gates 36. Output terminal #1 now sees the zero in stage S1, terminal #2 sees the one in stage S2, etc. Near the end of the second clock period, a pulse in waveform B shifts register 20 once again to produce the sequence 1011100, and since AND gates 36 are still enabled by the raised output of Flip-Flop 32, this new bit sequence is presented to the output terminals. The register continues to be advanced at the end of each clock period, and after a complete cycle of 8 clock periods, each of the code words or messages shown in FIGURE 3 will have been generated at the respective output terminals.

It may thus be seen that the shift register circuit of this invention, using only seven stages and associated logic gates, is effective to serially generate all of the 16 code words in a biorthogonal set in 8 clock or bit periods. The hardware savings realized by this arrangement, as contrasted to the prior art, renders this invention particularly useful where cost and weight considerations are critical. Although the invention has been disclosed in connection with a phase-coherent communications receiver, it is not limited to such a use, and has equal application to the transmitter of such a system or any other environment in which orthogonal code words sets must be generated.

The shift register stages and circuit components shown as blocks in FIGURE 1 may take any convenient form known in the art, such being without the scope of this invention.

What is claimed is:

1. An electronic circuit for serially generating all but one of the orthogonal code words in an $n$ word set of $n$ bit words, comprising:

(a) a shift register having $n-1$ stages, (b) means connecting the output from the last stage of the register to the input of the first stage, (c) means for loading the last $n-1$ bits of an orthogonal code word into the register, (d) output terminal means coupled to each stage of the register, and (e) means for stepping the register, whereby a different orthogonal code word is serially generated at each output terminal means as the register is shifted through a complete $n$ step cycle.

2. An electronic circuit as defined in claim 1 wherein:

(a) each output terminal means includes an AND gate having one input connected to its associated register stage, and further comprising (b) means connected to the other input of each AND gate for disabling the gates during the first step in the cycle, and (c) an additional output terminal connected to a source of constant potential.

3. An electronic circuit as defined in claim 1 further comprising an inverter connected to each output terminal means for providing a complement of the orthogonal code word generated thereat, thereby expanding the $n-1$ orthogonal code words into $2(n-1)$ biorthogonal code words.

4. The electronic circuit as defined in claim 2 further comprising an inverter connected to the output of each AND gate and to the additional output terminal for providing the complement of the orthogonal code word generated thereat, thereby expanding the orthogonal set of $n$ words into a biorthogonal set of $2n$ code words.

References Cited

UNITED STATES PATENTS

| | | |
|---|---|---|
| 3,041,396 | 6/1962 | Ostendorf et al. |
| 3,051,940 | 8/1962 | Fleckenstein. |
| 3,271,517 | 9/1966 | de Rosa. |
| 3,291,910 | 12/1966 | Nicklas. |
| 3,300,582 | 1/1967 | Himes. |

THOMAS A. ROBINSON, Primary Examiner

U.S. Cl. X.R.

178—79; 340—168